April 12, 1966    G. MOLE    3,246,237
APPARATUS FOR DETECTING DISCHARGES IN INSULATION AND FOR
DISCRIMINATING BETWEEN SUCH DISCHARGES AND ANY
DISCHARGES OCCURING IN TERMINATION MEANS
CARRIED BY SUCH INSULATION
Filed June 6, 1962    3 Sheets-Sheet 1
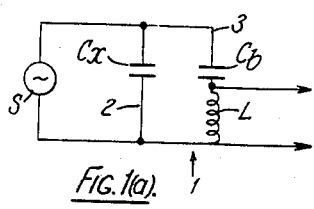
FIG.1(a).
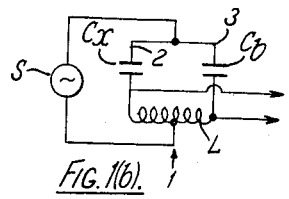
FIG.1(b).
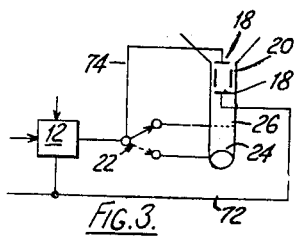
FIG.3.
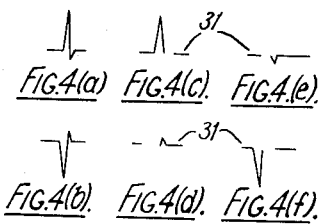
FIG.4(a). FIG.4(c). FIG.4(e).
FIG.4(b). FIG.4(d). FIG.4(f).
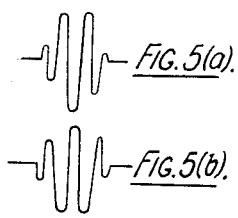
FIG.5(a).
FIG.5(b).
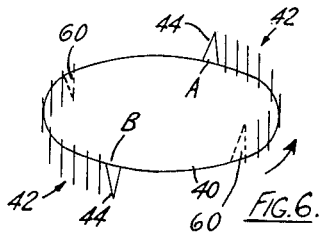
FIG.6.
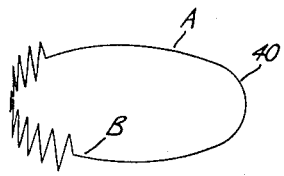
FIG.7.
FIG.8.
FIG.9.
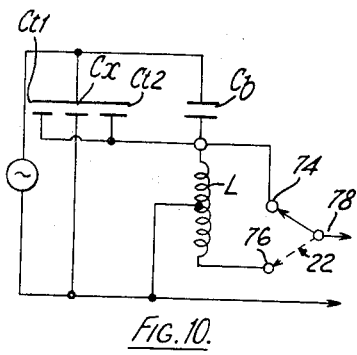
FIG.10.
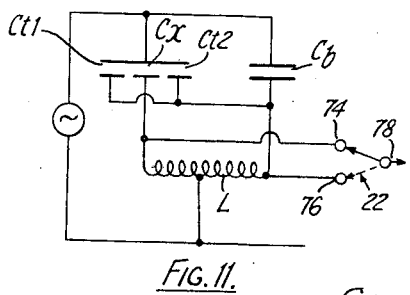
FIG.11.
Inventor
George Mole
By
Holcomb, Wetherill & Brisebois
Attorneys Inventor
George Mole
By
Attorneys April 12, 1966   G. MOLE   3,246,237
APPARATUS FOR DETECTING DISCHARGES IN INSULATION AND FOR
DISCRIMINATING BETWEEN SUCH DISCHARGES AND ANY
DISCHARGES OCCURING IN TERMINATION MEANS
CARRIED BY SUCH INSULATION
Filed June 6, 1962

FILTER AND AMPLIFYING CIRCUIT

FILTER AND AMPLIFYING CIRCUIT

Inventor
George Mole
By
Attorneys

3,246,237
APPARATUS FOR DETECTING DISCHARGES IN INSULATION AND FOR DISCRIMINATING BETWEEN SUCH DISCHARGES AND ANY DISCHARGES OCCURRING IN TERMINATION MEANS CARRIED BY SUCH INSULATION
George Mole, Surrey, England, assignor to E.R.A. Patents Limited, Leatherhead, Surrey, England, a British company
Filed June 6, 1962, Ser. No. 200,481
14 Claims. (Cl. 324—54)

The present invention is concerned with methods and apparatus for the discharge testing of electrical insulation (e.g. a sample in the form of the built-up insulation of electrical equipment or a sample comprising a piece of insulating material) having what—for want of a better term—are referred to as terminations.

Electrical insulation as usually manufactured contains unwanted voids across each of which a potential builds up on application of an increasing voltage across the insulation as a whole, and at the so-called discharge inception voltage this built-up potential is suddenly reduced as part or the whole of the charge on one wall of the void passes from this wall to the other and in so doing ionises the gas within the void. It is of interest to be able to investigate such discharges, and apparatus has been provided for this purpose, preferred to variously as discharge detectors, ionisation detectors, and (in the United States) corona detectors. In carrying out a discharge test on insulation with such apparatus, it is of importance that the required electric stress be produced in the insulation without limitation due to breakdown or flashover at its ends or edges, and also that any discharges occurring at the ends or edges do not swamp the wanted response from discharges within the insulation. It is for these purposes that terminations are often specially provided. It is usually the case that special terminations are incorporated during manufacture or installation of the built-up insulation of high voltage electrical equipment, these terminations serving the purpose of preventing breakdown or flashover in normal operation. In carrying out discharge tests on such insulation it is of importance that discharges occurring in the terminations do not swamp the wanted response from discharges within the insulation itself.

Various forms of termination are employed. Thus, for example, when the insulation is in the form of a sample of sheet material, the terminations usually take the form of guard-rings with or without provision for stress relief which extend around the periphery of the sample. For insulation in the form of lengths of cable, the terminations often take the form of stress-relief cones. For transformers, the terminations are in the form of bushings, whilst for bushings, the usual porcelain shell may be regarded as a form of termination.

On making a discharge test on insulation having a termination, the question arises as to whether observed discharges originate within the insulation itself or within the termination. Hitherto, as far as is known, this question has not been answered in the case of testing methods in which an alternating supply voltage of predetermined frequency is applied across a tuned test circuit (as distinct from a bridge circuit) in which the insulation and a so-called blocking capacitor (which may be constituted by a part of the insulation if the latter can be split into two parts) are connected to terminals of an inductor, the insulation and the blocking capacitor being arranged in opposite branches of the tuned circuit, whilst the inductor is arranged either wholly in one branch, or wholly in the other, or partly in each of the two branches. When the alternating supply voltage (which may be of the order of kilovolts) is applied across these two branches of the tuned circuit, any discharge in the insulation causes the application of a potential step across the inductor and this is used to detect the discharge.

According to the present invention, apparatus is provided comprising an inductor, input terminals connected to said inductor for the connection of said insulation, a blocking capacitor, and said termination to said inductor, a filter and amplifier circuit connected to said inductor to receive therefrom an electric signal, to filter off a predetermined band of frequencies, and to amplify the transmitted signal within the passband of said filter, an indicator connected to said circuit to give an indication controlled by the amplified signal, and a switch connected in said apparatus between said terminals and said indicator and movable to change said indication. In use, the insulation and the blocking capacitor are connected to the terminals to produce the tuned circuit for the application of an alternating supply voltage, whilst the termination or terminations are connected in the tuned circuit so as to be disposed across either the insulation or the blocking capacitor. Discharges in the insulation or in the termination are indicated by the indicator, and the switch serves to permit of discrimination between discharges in the insulation and discharges in the terminations by virtue of the change in the indication brought about by switch operation.

The switch may be connected up in various ways. In one particular example, first, second and third input terminals are provided, the first and second terminals being connected to opposite ends of the inductor, and the third terminal is then arranged so as to be selectively connectable to the ends of the inductor by the switch. In use, one side of the insulation and one side of the blocking capacitor are connected to the first and second terminals respectively, and the other sides of the insulation and blocking capacitor are connected together. In this way the tuned circuit for the application of the alternating supply voltage is produced. One side of the termination is now connected to the common side of the insulation and the blocking capacitor, whilst the other side of the termination is connected to the third terminal. Now, in one position of the switch the termination is connected across the insulation, whilst in the other position of the switch the termination is connected across the blocking capacitor. If now a discharge takes place in the termination, and if the insulation and the blocking capacitor have different capacitances while as is usual the termination has a capacitance which is small compared with that of the insulation, the size of the step signal which appears at the inductor will depend upon the position of the switch, but if a discharge takes place in the insulation, the size of the step will be substantially independent of the position of the switch. Thus, if the magnitude of the indication given by the indicator changes on operation of the switch it will be known that the discharge originated in the termination whilst if there is substantially no change, it will be known that the discharge originated in the insulation. The indicator may be a pointer-type indicating instrument e.g. of the moving coil type, the instrument giving an indication in accordance with the size of the step.

It will be appreciated that the step signal at the inductor is accompanied by alternating components of the frequency of the supply voltage and harmonics of these, and these are filtered off by the filter part of the circuit referred to. The remaining components produce a transient signal, the form of which depends upon the form of the filter employed. If the filter is of the narrow band type, the transient will be in the form of an oscillating signal having peaks of alternating polarity which first increase in magnitude and then decrease. The signal applied to the indicator may be either the complete transient or its envelope.

If, on the other hand, the filter is of the wide band type, it may be designed so that the transient signal produced has after one peak of either positive or negative polarity a small number of smaller and decreasing peaks of alternating polarity. If the initial step signal at the inductor is of suitable polarity, the largest peak of this transient signal will be positive, whilst if the initial step signal is of the opposite polarity, the largest peak of the transient signal will be negative. It might be thought, from this, that it would be possible to discriminate between discharges in the insulation and in the termination by connecting the termination permanently across the blocking capacitor and simply noting the polarity of the largest peak of the transient signal, since with this arrangement a discharge in the insulation would produce a step signal of one polarity and a discharge in the termination a step signal of the reverse polarity. This, however, is not always the case since discharges may follow one another with great rapidity, may be of mixed amplitudes, and may vary in exact location on the waveform of the supply voltage from cycle to cycle, so that it is often not possible to examine a single indication in isolation from the others, and so that it is often not possible to determine from the indicator the datum or zero position from which the indication is to be measured.

It is because of these considerations that it is preferred to employ a cathode ray tube as the indicator and to provide the switch between the terminals and the modulation means of the cathode ray tube. The signal produced by the filter and amplifying circuit is then applied, not only to the ray deflection means of the cathode ray tube so as to provide the required indication, but also to the modulating means of the tube. When, therefore, the stepwave at the inductor has one polarity the largest peak of the transient trace on the tube will be brightened whilst its smaller peaks will be dimmed, whilst for a stepwave of reverse polarity the largest peak of the transient trace on the tube will be dimmed and the smaller peaks brightened. Thus, by moving the switch from one position to the other, the base line of the trace is readily determined and it becomes possible easily to discover whether any particular transient trace on the tube is derived from a positive or negative stepwave at the inductor. In this way, it becomes possible easily to discriminate between pulses produced by discharges in the insulation and those produced by discharges in the termination.

It will be appreciated that the polarity of a step signal at the inductor depends, not only upon whether the discharge takes place in the insulation or in the termination but also upon the polarity of the alternating voltage at the time of the discharge. Because of this, in use, the time base of the cathode ray tube is under the control of the means which provides the alternating voltage so that one part of the trace on the tube always represents the positive applied voltage whilst the other part represents the negative applied voltage to the tuned circuit.

The switch may be located between the terminals and the modulating means in any one of a number of different positions. The switch may, for example, be located between the filter and amplifier circuit and the modulating means. When positioned in this way, the switch may be arranged so as to be movable between a first position connecting the cathode and the grid (constituting the modulating means) across the output of the circuit in one direction and a second position connecting the cathode and grid to the output of the circuit in a second direction opposite to the first. As an alternative, however, the switch may be movable between a first position connecting the cathode to the circuit and a second position connecting the grid to the circuit.

The switch need not be located between the circuit and the modulating means but may, for example, be located between the inductor and the circuit, being movable between two positions to reverse the polarity of the signal applied to the circuit, and hence the polarity of the modulating signal. A further possibility is to locate the switch in the circuit itself, the switch being movable between two positions to reverse the polarity of the amplified signal and hence the polarity of the modulating signal. The switch may also be located between the terminals and the inductor.

If the operation of the switch reverses the signal applied to the ray deflection means of the cathode ray tube, as well as reversing the signal applied to the modulation means, there will be a reversal in the direction of the trace seen on the tube and this must be taken into account in interpreting the observations.

The invention will now be described in more detail with reference to the accompanying drawings in which:

FIGURES 1(a) and 1(b) show two different tuned circuits for carrying out the discharge on the insulation alone;

FIGURE 3 shows a modification of this testing arrangement;

Figure 2:
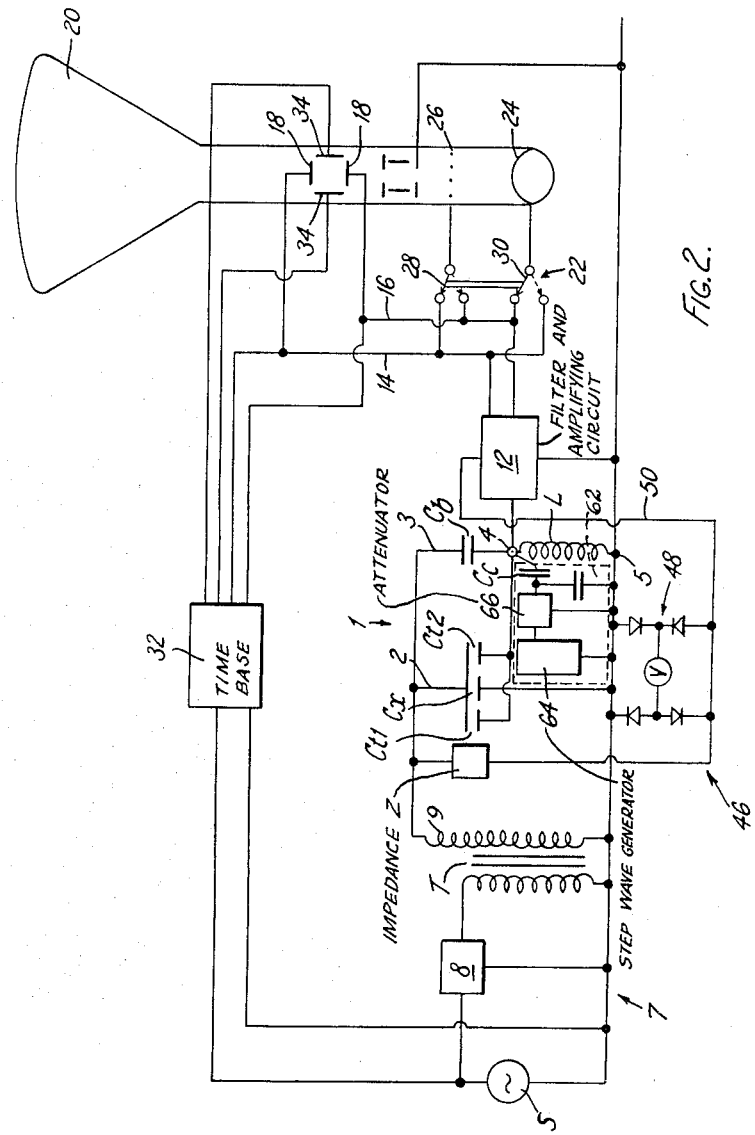
FIGURE 2 is a diagram of a testing arrangement according to the invention.
Figure 12:
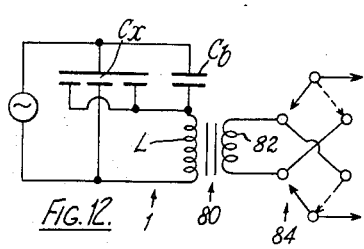
Figure 14:
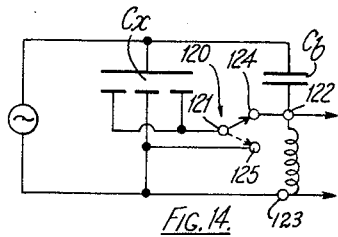
Figure 13:
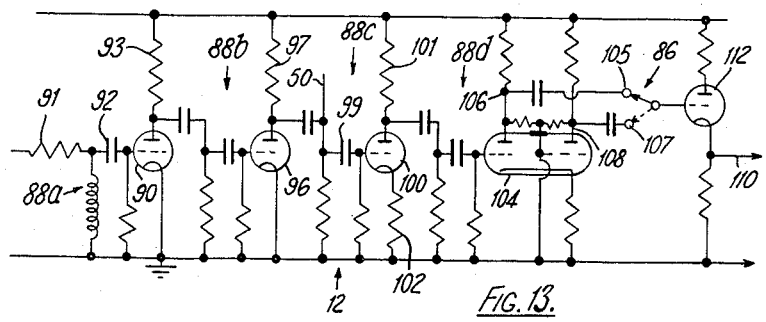
Figure 15:
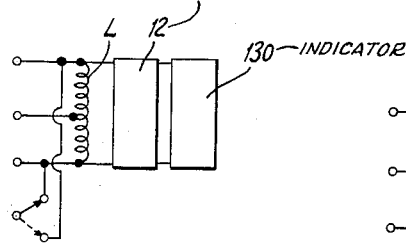
Figure 16:
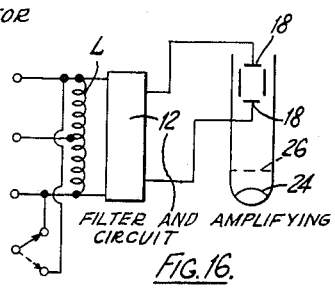
Figure 17:
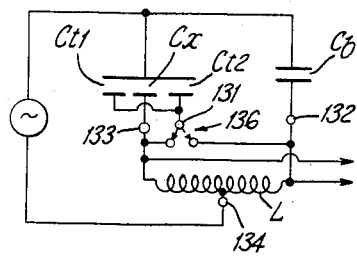

FIGURES 4(a)–4(f) and FIGURES 5(a) and 5(b) represent various electric signals;

FIGURES 6 and 7 show two different traces obtained on the cathode ray tube;

FIGURES 8 and 9 show parts of other traces obtained on the tube;

FIGURES 10 to 12 show further modifications of the arrangement shown in FIGURE 2;

FIGURE 13 is a circuit diagram of the filter and amplifier circuit employed, the switch being included in this circuit;

FIGURE 14 shows a tuned circuit incorporating the switch;

FIGURE 15 represents an apparatus in accordance with the invention for use with the circuit shown in FIGURE 14;

FIGURE 16 is similar to FIGURE 15 but shows a modification including a cathode ray tube as the indicator; and FIGURE 17 shows a further tuned circuit incorporating the switch.

Referring first of all to FIGURE 1, a tuned circuit 1 comprises two branches 2 and 3 which are connected together in parallel across a source S of alternating potential of predetermined frequency. The branch 2 includes simply the insulation under investigation, referred to hereinafter as the sample, which is represented by the capacitance $C_x$, whilst the branch 3 comprises the blocking capacitor $C_b$ and an inductor L. When a discharge takes place in $C_x$, a stepwave is produced in this inductor L and this is passed through filters for filtering off a predetermined band of frequencies including that of the voltage of the predetermined frequency to a discharge detector and amplifier, and thence to the deflection and/or modulation electrodes of a cathode ray tube. If desired, the inductor L may, of course, be the primary winding of a transformer, the secondary winding of which is connected to the filter circuits. Again, the inductor L may be mounted wholly in the branch 2 if desired. A further possibility is shown in FIGURE 1b where the inductor is disposed in both the branches and where the test voltage is applied at the centre of the inductor.

When the circuit shown in FIGURE 1(a) is employed with a sample having terminations, this circuit may be modified as shown in FIGURE 2, where the terminations are represented as $C_{t1}$ and $C_{t2}$. As can be seen, the input terminals 4, 5 are provided, these being connected to the inductor L for the connection of the blocking capacitor and terminations and the sample respectively. The terminations $C_{t1}$ and $C_{t2}$ are connected across the blocking capacitor $C_b$ and in the opposite branch, therefore, from the branch containing the sample $C_x$. The polarity of any stepwave produced in the inductor L by a discharge thus depends upon whether the discharge takes place in the sample $C_x$ or in a termination $C_{t1}$ or $C_{t2}$, since the sample C is connected to the opposite end of the inductor from that to which the terminations are connected.

Means is provided, shown at 7, for applying to the tuned circuit 1 an alternating voltage of predetermined frequency. This means 7 includes a source S (which may be the mains) connected through a voltage regulator 8 to the primary winding of a transformer T, the secondary winding 9 of which is connected across the two branches 2 and 3.

When a stepwave is produced at the inductor L a corresponding step signal is applied to a filter and amplifying circuit 12. The filtering part of this circuit filters off a band of frequencies, including components having the frequency of the source S and harmonics of this and the amplifier serves to amplify the remaining components within the passband of the filters. The filter part of the circuit 12 has a wide passband and thus converts the initial step signal into one in the form of a sharp pulse which, however, has a small overshoot of reverse polarity. The output from the circuit 12 is applied through respective conducting lines 14 and 16 to opposite y plates 18 of a cathode ray tube 20, these plates 18 constituting part of the ray deflecting means of the tube 20. The output signal from the circuit 12 is also applied through a switch 22 to the modulation means of the tube 20, comprising a cathode 24 and a grid 26. The switch 22 has two ganged arms 28 and 30 which, in one position, apply the signal across the cathode 24 and grid 26 in one direction, whilst in the other position of these arms the signal is applied to the grid and cathode in the reverse direction. If, therefore, the output signal from the circuit 12 is in the form of a positive pulse with a small negative overshoot, as shown in FIGURE 4(a), then with the switch in one position the transient trace on the tube 20 will be as shown in FIGURE 4(c), whilst with the switch in the opposite position the transient trace will be as shown in FIGURE 4(e). The switch may be provided with a third position in which the signal is not applied to the cathode and grid, and in that case the transient trace on the tube would be as shown in FIGURE 4(a). If, however, the signal from the circuit 12 is a negative pulse with a short positive overshoot as shown in FIGURE 4(b), then the transient trace on the tube will be as shown in FIGURES 4(d) and 4(f) for the two positions of the switch.

It can be seen from FIGURES 4(c), 4(e), 4(d), 4(f) that by switching the switch 20 from one position to the other the base line of the trace, shown at 31, can readily be determined and the direction of the main part of the pulse can thus readily be deduced, this direction being dependent on whether a discharge takes place in the sample $C_x$ or in a termination.

This direction also depends, however, upon the polarity of the voltage applied to the branches 2, 3 at the instant of the discharge, a polarity which is constantly changing since the source S provides a sinusoidal output. It is thus of importance to provide means for determining whether a discharge takes place when the applied voltage is positive or when it is negative. It is for this reason that the tube 20 is provided with a time base 32 which is under the control of the source S. This time base 32 is in the form of a phase shifter provided with two outputs, one of which is applied across the y plates 18 and the other of which is applied across the x plates, shown at 34. In this particular embodiment, the time base circuit 32 is such that the trace on the tube 20 is elliptical, one half of the ellipse representing a positive voltage applied to the tuned circuit 1, and the other half representing a negative applied voltage. It is necessary to discover which half of the trace represents which polarity. It is possible to do this in one or other of two ways. In the first, a second sample, which is such that discharges readily take place, is applied across the sample $C_x$. This second sample may, for example, be a low voltage mica capacitor. It will now be known that all the transient traces on the tube will be caused by discharges in this capacitor. The trace on the tube may, therefore, take the form shown in FIGURE 6 where the elliptical part 40 of the trace is produced by the time base 32 and where the transient traces, shown generally at 42, are produced by the discharges in the mica capacitor. It will be noticed that all the transient traces 42 from a point A to a point B in an anticlockwise direction are mainly downwardly directed, whilst those from the point B to the point A in an anticlockwise direction are mainly upwardly directed. The points A and B represent, in fact, the peaks of the alternating voltage applied to the tuned circuit 1. Any downwardly directed transient trace from the point A to the point B in an anticlockwise direction thus represents a discharge in a capacitor in the branch 2 (so that they represent a discharge in the sample $C_x$ when the mica capacitor has been removed), whilst upwardly directed transient traces from the point A to the point B in an anticlockwise direction must represent discharges in a termination $C_{t1}$ or $C_{t2}$. For transient traces from the point B to the point A in an anticlockwise direction, the reverse applies.

FIGURE 7 shows one example of a trace on the tube obtained with the mica capacitor removed. It can be seen from this that it is rather difficult, over the area of the transient traces, to determine the base line 40 of the trace. By switching the switch 22 between its two extreme positions, however, the trace alternates between those shown in FIGURES 8 and 9 and it becomes quite obvious from these figures that the transient trace is mainly an upwardly directed one, representating a discharge in a termination.

The second way of discovering which half of the trace represents which polarity is by providing marker traces, shown at 44 in FIGURE 6, to indicate on the trace the peak or zero points of the applied voltage. Such marker pulses 44 are produced by the marker circuit 46 shown in FIGURE 2. The input of this circuit 46 is connected across the secondary winding 9 of the transformer T so as to receive the same alternating voltage as is applied to the circuit 1. This circuit 46 includes an impedance Z connected to a full wave bridge rectifier 48 connected through a line 50 to one of the stages of the circuit 12 so as to be mixed with the signals produced by the stepwave at the inductor L. It will be appreciated that the signal applied through the line 50 contains transients generated by the rectifiers 48 owing to the normal discontinuities in their characteristic curves, these being sharpened up by the filter part of the circuit 12 so as to produce the sharp pulses illustrated at 44 in FIGURE 6. If, the marker pulses 44 are to mark the zero points of the applied voltage, the impedance Z should be resistive.

If, however, it is desired not to mark the zero points but the peak values of the voltage applied to the tuned circuit 1, then the impedance Z is made capacitive to provide a phase shift causing the marker pulses 44 to be moved through 90° to the positions shown at 60. A voltmeter V is provided in the rectifier circuit 48 to provide a measure of the voltage applied to the sample $C_x$ under investigation.

In order to permit the size of the traces 42 to be measured, a calibration circuit 62 is provided. This circuit 62 includes a stepwave generator 64 connected through an adjustable attenuator 66 and a coupling capacitor $C_c$ to the inductor terminals 4 and 5. In this way, extra transient traces may be provided on the elliptical base line 40, these extra traces having a predetermined height determined by the adjustment of the attenuator 66. This attenuator 66 is, therefore, adjusted until the height of the calibration traces is the same as a trace of interest produced by a discharge in the sample $C_x$ or termination. The magnitude of the discharge can then be determined from the adjustment of the attenuator 66, the magnitude of the stepwave generated by the generator 64, and the size of the capacitor $C_c$.

In the modification shown in FIGURE 3, the circuit 12 is connected selectively by the switch 22 either to the grid 26 or the cathode 24. The cathode is connected through a line 72 to the bottom *y* plate 18, whilst the top *y* plate 18 is connected permanently to the circuit 12 through a line 74.

In the arrangements shown in FIGURES 2 and 3, the reversing switch 22 is provided between the circuit 12 and the indicator or cathode ray tube 20. FIGURES 10 to 12 show modifications in which the switch is provided instead between the inductor L and the circuit 12. In the first modification, shown in FIGURE 10, the inductor L has three terminals, two at its ends and one at its mid point. The two end terminals are connected to switch contacts 74, 76 which are selectively connectable to a line 78 which is connected to the input of the circuit 12. By moving the switch 22 from one position to the other the polarity of the signal applied to the circuit 12 is reversed. Thus, not only is the modulating signal reversed which is applied across the grid 26 and cathode 24, but also the deflecting signal which is applied across the plates 18, and this must be borne in mind in interpreting the trace on the tube 20.

FIGURE 11 shows a further modification in which the tuned circuit shown in FIGURE 1(*b*) is employed. Here the two switch contacts 74 and 76 of the switch 22 are connected to the two ends of the inductor L.

In the modification shown in FIGURE 12, the tuned circuit of FIGURE 1(*a*) is employed but here the inductor L constitutes the primary winding of a transformer 80 having a secondary winding 82 connected across a reversing switch 84, the output terminals of which are connected across the input of the circuit 12.

FIGURE 13 shows a further modification in which the reversing switch, shown at 86, is provided in the circuit 12 itself. This circuit 12, which is shown in somewhat simplified form, includes a filter having a number of stages 88*a*, 88*b*, 88*c* and 88*d* which together permit signals of the frequency of the source S to be bypassed to earth but which do not allow such bypassing of signals falling within the passband of the filter. Such signals are therefore, passed through the circuit 12 and amplified by it in a number of stages. The first amplifying stage includes a tube 90 with resistor 91 and capacitor 92 in the grid circuit and anode load 93. The output is applied through the filter stage 88*b* to a further amplifying tube 96 having an anode load 97. The output from this tube 96 is applied through the next filter stage 88*c* to a further amplifying tube 100. The marker signals are also applied to this tube 100 through a capacitor 99 which, as is shown, is connected to the line 50. The tube 100 has an anode load 101 and the output signals are applied through the further filter stage 88*d* to a double triode 104. The tubes 90, 96 and 100 are shown as triodes for simplicity but in practice they are pentodes, connected in the normal way. A double triode tube 104 constitutes a phase splitter so that the signal obtained at a contact 105 from the anode 106 of the lefthand part of the tube 104 is in antiphase with the signal obtained at a contact 107 connected to the anode 108 of the righthand part of the double triode tube 104. Thus the polarity of the signal selected by the switch 86 depends upon the position of the switch, and the same applies to the polarity of the signal obtained at a line 110 which is connected to receive the output of a cathode follower 112 and which is connected to the deflection plates 18 and to the grid 26.

In all the examples given so far, the switch for reversing the signal is located to the output side of the inductor L. This is not, however, essential and indeed in the FIGURE 14 arrangement the reversing switch 120 is provided at the input side of the inductor L. In this arrangement, the first, second, and third input terminals 121, 122 and 123 respectively are provided, the first terminal 121 being connected permanently to one side of each termination $C_{t1}$ and $C_{t2}$ the terminal 122 being permanently connected to one side of the blocking capacitor $C_b$ and to one switch contact 124 of the switch 120, whilst the terminal 123 is connected permanently to one side of the sample $C_x$ and also to the other switch contact 125 of the switch 120. It can be seen that in this arrangement, the terminations are not connected permanently across the blocking capacitor $C_b$ but may be switched either across this blocking capacitor or across the sample $C_x$. It will be appreciated that if a discharge takes place in the sample $C_x$ then the direction of the stepwave at the inductor L will be independent of the position of the switch 120, whilst if a discharge takes place in a termination the direction will be dependent upon the position of the switch 120. This difference could, if desired, be employd as in the previous examples to distinguish discharges in the sample and in a termination. An alternative method is available here, however, if, as is usual, the sample $C_x$ and the blocking capacitor $C_b$ have different capacitances while the terminations $C_{t1}$ and $C_{t2}$ have a capacitance small compared with $C_x$. With these conditions, the actual magnitude of the step signal at the inductor L is independent of the position of the switch 120 if the discharge is in the sample $C_x$, whilst the size of the stepwave alters on change of position of the switch 120 if the discharge occurs in a termination.

The apparatus employed here need not include a cathode ray tube, since the magnitude alone of the signals produced enables a discrimination to be made between discharges in the sample and discharges in the terminations. Thus, as shown in FIGURE 15, the circuit 12 may be connected to any indicator 130 which responds to the size of the signal applied to it. The indicator 130 may, however, if desired be in the form of a cathode ray tube as shown in FIGURE 16.

Because of the indicator 130 must merely respond to the magnitude of the applied signal it is not so important to provide a wide band filter part to the circuit 12. Indeed a narrow band filter part may be employed, in which case the signal applied to the indicator 130 may take either of the forms shown in FIGURE 5, depending upon the polarity of the signal applied to the circuit 12. The indicator may be such as to respond to the envelope of the signal illustrated.

In the final modification shown in FIGURE 17, input terminals 131, 132 and 133 are provided which are connected, as in FIGURE 14, to one side of the terminations, to one side of the blocking capacitor $C_b$, and to one side of the sample $C_x$ respectively. In addition a fourth terminal 134 is provided for the application of alternating voltage to the centre of the inductor L. The reversing switch 136 enables the termination $C_{t1}$, $C_{t2}$ to be connected to either end of the inductor L so as to connect the terminations either across the sample $C_x$ or across the blocking capacitor $C_b$.

I claim:

1. Apparatus for detecting discharges in insulating means and for discriminating between such discharges and any discharges which may occur in termination means carried by such insulating means, said apparatus comprising a blocking capacitor and inductance means connected to each other, means for connecting a source of alternating current across both said capacitor and said inductance means, means for connecting one of said insulating and said termination means across said source in parallel with both said capacitor and inductance means to form therewith a tuned circuit, means for connecting the other of said insulating and termination means in said tuned circuit in parallel with said capacitor but in series with said inductance means, whereby a wave form resulting from a discharge in said insulating means approaches said inductance means from one direction, but one resulting from a discharge in said termination means approaches said inductance means from the opposite direction, a filter and amplifying circuit connected across said inductance means to receive therefrom an electric signal, filter off a predetermined band of frequencies, and amplify the remaining components within the passband of the filter, an indicator connected to be supplied with a signal by said filter and amplifying means and switch means in the electrical pathway between said source and said indicator connected to reverse the polarity of the signal supplied to said indicator.

2. Apparatus as claimed in claim 1 in which said indicator is a cathode ray tube having ray deflection means connected to be supplied by said filter and amplifying circuit to give an indication controlled by the amplified signals and modulation means connected to said filter and amplifying circuit to receive a modulating signal and to provide for brightening of part of said indication and dimming of a second part of said indication.

3. Apparatus according to claim 2 in which, said switch connects said filter and amplifier circuit and said modulating means.

4. Apparatus according to claim 3, said modulating means comprising a cathode and a grid, said switch being movable between a first position connecting said cathode and said grid across the output of said filter and amplifying circuit in one direction, and a second position connecting said cathode and said grid to the output of sad filter and amplifying circuit in a second direction opposite to the said one direction.

5. Apparatus according to claim 3, said modulating means comprising a cathode and a grid, said switch being movable between a first position connecting said cathode to said filter and amplifying circuit and a second position connecting said grid to said filter and amplifying circuit.

6. Apparatus according to claim 2 in which, said switch connects said inductor and said filter and amplifying circuit and being movable between two positions to reverse the polarity of the signal applied to said filter and amplifying circuit and hence the polarity of said modulating signal.

7. Apparatus according to claim 2, said switch being located in said filter and amplifying circuit and being movable between two positions to reverse the polarity of the said amplified signal and hence the polarity of the said modulating signal.

8. Apparatus for detecting discharges in insulating means and for discriminating between such discharges and any discharges which may occur in termination means carried by said insulating means, said apparatus comprising a blocking capacitor and inductance means connected to each other, means for connecting a source of alternating current across both said capacitor and said inductance means, means for connecting one of said insulating and said termination means across said source in parallel with both said capacitor and inductance means to form therewith a tuned circuit, switch means positioned to connect the other of said insulating and said termination means in said tuned circuit in parallel with said blocking capacitor when in a first position and in parallel with said insulating means when in a second position, thereby reversing the direction in which a wave form resulting from a discharge in said termination means approaches said inductance, a filter and amplifying circuit connected across said inductance to receive therefrom an electric signal, filter off a predetermined band of frequencies, and amplify the remaining components within the pass band of the filter, and an indicator connected to be supplied with a signal by said filter and amplifying means.

9. Apparatus according to claim 8, said indicator comprising a cathode ray tube having ray deflection means connected to said circuit to give an indication controlled by the amplified signal.

10. Apparatus as claimed in claim 8 in which said indicator is a cathode ray tube having ray deflection means connected to be supplied by said filter and amplifying circuit to give an indication controlled by the amplified signals and comprising modulation means connected to said filter and amplifying circuit to receive a modulating signal and to provide for brightening of part of said indication and dimming of a second part of said indication.

11. Apparatus according to claim 1, said indicator comprising a cathode ray tube having ray deflection means connected to said filter and amplifying circuit to give an indication controlled by the amplified signal, the said arrangement comprising a time base circuit connected between the means for providing the alternating voltage and said ray deflection means to provide a time base on said tube.

12. Apparatus according to claim 2 and comprising a marker circuit connected to said tuned circuit to receive a similar alternating voltage to that applied to the said tuned circuit by the means for providing the said alternating voltage, said marker circuit being connected to said ray deflection means to produced marker pulses on the trace on said tube.

13. Apparatus according to claim 2, and comprising a calibration circuit connected to provide said ray deflection means with calibrating signals to provide calibrating indications on the trace on said tube.

14. Apparatus according to claim 13, said calibration circuit being adjustable to provide a control over the size of the calibration indications.

References Cited by the Examiner

Dakin and Malinaric: "A Capacitance Bridge Method for Measuring Integrated Corona Charge Transfer and Power Loss Per Cycle," AIEE Conference Paper No. CP 60–97, January 1960, 11 pages.

WALTER L. CARLSON, *Primary Examiner.*

G. R. STRECKER, *Assistant Examiner.*